United States Patent
Lee et al.

(10) Patent No.: US 8,792,436 B2
(45) Date of Patent: Jul. 29, 2014

(54) METHOD AND APPARATUS FOR RECEIVING AND TRANSMITTING SIGNALS IN WIRELESS COMMUNICATION SYSTEM

(75) Inventors: Moon Il Lee, Anyang-si (KR); Wook Bong Lee, Anyang-si (KR); Jae Hoon Chung, Anyang-si (KR); Yeong Hyeon Kwon, Anyang-si (KR); Hyun Soo Ko, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 129 days.

(21) Appl. No.: 13/143,724

(22) PCT Filed: Jan. 29, 2010

(86) PCT No.: PCT/KR2010/000550
§ 371 (c)(1),
(2), (4) Date: Jul. 7, 2011

(87) PCT Pub. No.: WO2010/087645
PCT Pub. Date: Aug. 5, 2010

(65) Prior Publication Data
US 2011/0274071 A1    Nov. 10, 2011

Related U.S. Application Data

(60) Provisional application No. 61/148,398, filed on Jan. 30, 2009.

(30) Foreign Application Priority Data

Jan. 28, 2010  (KR) ........................ 10-2010-0008123

(51) Int. Cl.
*H04B 7/04*  (2006.01)

(52) U.S. Cl.
USPC .......................................................... 370/329

(58) Field of Classification Search
USPC .......... 370/328, 329, 260, 336; 375/260, 267; 455/9, 522, 73, 502; 714/749
See application file for complete search history.

(56) References Cited

U.S. PATENT DOCUMENTS

| | | | |
|---|---|---|---|
| 8,239,721 B2 * | 8/2012 | Pelletier et al. | 714/749 |
| 8,351,974 B2 * | 1/2013 | Ahn et al. | 455/522 |
| 8,422,439 B2 * | 4/2013 | Nimbalker et al. | 370/329 |
| 2002/0056066 A1 * | 5/2002 | Gesbert et al. | 714/759 |
| 2005/0099975 A1 * | 5/2005 | Catreux et al. | 370/329 |
| 2008/0267138 A1 * | 10/2008 | Walton et al. | 370/336 |

(Continued)

FOREIGN PATENT DOCUMENTS

| | | |
|---|---|---|
| KR | 1020030087296 | 11/2003 |
| KR | 1020070091889 | 9/2007 |
| WO | 03/085876 | 10/2003 |

*Primary Examiner* — Chirag Shah
*Assistant Examiner* — Jael Ulysse
(74) *Attorney, Agent, or Firm* — Lee, Hong, Degerman, Kang & Waimey

(57) ABSTRACT

A method and apparatus for receiving and transmitting signals in a wireless communication system are provided. The method of receiving signals includes configuring a system mode and receiving the signals according to the system mode, wherein the system mode is either a first system mode or a second system mode, when the system mode is the first system mode, the signals are transmitted through a maximum of N transmit antennas, and when the system mode is the second system mode, the signals are transmitted through a maximum of M (N<M) transmit antennas.

10 Claims, 6 Drawing Sheets

(56) References Cited

U.S. PATENT DOCUMENTS

| | | | |
|---|---|---|---|
| 2010/0091919 A1* | 4/2010 | Xu et al. | 375/346 |
| 2010/0119001 A1* | 5/2010 | Walton et al. | 375/260 |
| 2010/0158147 A1* | 6/2010 | Zhang et al. | 375/260 |
| 2010/0227569 A1* | 9/2010 | Bala et al. | 455/73 |
| 2011/0026631 A1* | 2/2011 | Zhang et al. | 375/267 |
| 2011/0096735 A1* | 4/2011 | Damnjanovic et al. | 370/329 |
| 2011/0159914 A1* | 6/2011 | Chen et al. | 455/522 |
| 2011/0243066 A1* | 10/2011 | Nayeb Nazar et al. | 370/328 |
| 2013/0012119 A1* | 1/2013 | Ma et al. | 455/9 |
| 2013/0028231 A1* | 1/2013 | Zhang et al. | 370/329 |
| 2013/0235825 A1* | 9/2013 | Walton et al. | 370/329 |

* cited by examiner

METHOD AND APPARATUS FOR RECEIVING AND TRANSMITTING SIGNALS IN WIRELESS COMMUNICATION SYSTEM

This application is the National Stage filing under 35 U.S.C. 371 of International Application No. PCT/KR2010/000550, filed on Jan. 29, 2010, which claims the benefit of earlier filing date and right of priority to Korean Application No. 10-2010-0008123, filed on Jan. 28, 2010, and also claims the benefit of U.S. Provisional Application Ser. No. 61/148,398, filed on Jan. 30, 2009, the contents of all of which are incorporated by reference herein in their entirety.

TECHNICAL FIELD

The present invention relates to wireless communications, and more particularly, to a method and apparatus for receiving and transmitting signals in a wireless communication system.

BACKGROUND ART

Wireless communication systems are widely spread all over the world to provide various types of communication services such as voice or data. The wireless communication system is designed for the purpose of providing reliable communication to a plurality of users irrespective of their locations and mobility. However, a wireless channel has an abnormal characteristic such as path loss, noise, fading due to multipath, an inter-symbol interference (ISI), the Doppler effect due to mobility of a user equipment, etc. Therefore, various techniques have been developed to overcome the abnormal characteristic of the wireless channel and to increase reliability of wireless communication.

Multiple Input Multiple Output (MIMO) is a technique for supporting reliable high-speed data services. The MIMO technique improves data transmission/reception efficiency by using multiple transmit (Tx) antennas and multiple receive (Rx) antennas. Examples of the MIMO technique include spatial multiplexing, transmit diversity, beamforming, etc.

Multiple receive antennas and multiple transmit antennas form a MIMO channel matrix. A rank can be found from the MIMO channel matrix. The rank is the number of spatial layers. The rank may also be defined as the number of spatial streams which can be transmitted at the same time by a transmitter. The rank is also referred to as a spatial multiplexing ratio. Assuming that the number of transmit antennas is Nt and the number of receive antennas is Nr, the rank R is $R \leq \min\{Nt, Nr\}$.

In general, a wireless communication system is a single carrier system supporting a single carrier. The transmission rate is proportional to transmission bandwidth. Therefore, for supporting a high-speed transmission rate, transmission bandwidth shall be increased. However, except for some areas of the world, it is difficult to allocate frequencies of wide bandwidths. For effectively using fragmented small frequency bands, a spectrum aggregation technique is being developed. The spectrum aggregation technique may be also referred to as bandwidth aggregation or carrier aggregation. The spectrum aggregation technique is to obtain the same effect as if which a frequency band of a logically wide bandwidth may be used by aggregating a plurality of physically contiguous or non-contiguous frequency bands in a frequency domain. Through the spectrum aggregation technique, multiple carriers can be supported in the wireless communication system. The wireless communication system supporting multi-carrier is referred to as a multi-carrier system. The carrier may be also referred to as a radio frequency (RF), component carrier (CC), etc.

Meanwhile, as a mobile communication system of a next generation (i.e., post-3rd generation), an international mobile telecommunication-advanced (IMT-A) system is standardized in an international telecommunication union (ITU). The purposes of IMT-A system are to provide a high-speed transmission rate of 1 gigabits per second (Gbps) in downlink communication and 500 megabits per second (Mbps) in uplink communication and to support an Internet protocol (IP)-based seamless multimedia service. In a 3rd generation partnership project (3GPP), a long term evolution-advanced (LTE-A) system is considered as a candidate technique for the IMT-A system.

In an LTE system, downlink transmission is supported for up to 4 transmit antennas, and uplink transmission is supported only for 1 antenna. In an LTE-A system, downlink transmission is considered to support up to 8 transmit antennas, and uplink transmission is considered to support multiple antennas. The LTE system is a single carrier system supporting one carrier. The LTE-A system is a multiple carrier system supporting multiple carriers.

An advanced system (e.g., an LTE-A system) having an increased number of transmit antennas in each of downlink transmission and uplink transmission, as described above, as compared with an existing system (e.g., an LTE system) can be taken into consideration. Further, the advanced system may be a system supporting an increased number of component carriers as compared with the existing system. With an increase in the number of transmit antennas and the number of component carriers, the transmission rate of information can be increased.

Although the advanced system is evolved to increase a completion level of the existing system, it is desirable that the advanced system should be designed to maintain backward compatibility with the existing system. This is because the provisioning of compatibility between the advanced system and the existing system is advantageous in terms of user convenience, and is also advantageous for a service provider since existing equipment can be reused.

For the purpose of compatibility with the existing system, different system modes, such as an advanced system mode and an existing system mode, may be defined in the advanced system. Accordingly, there is a need for a method and apparatus for efficiently transmitting and receiving signals in an advanced wireless communication system.

DISCLOSURE OF INVENTION

Technical Problem

The present invention provides a method and apparatus for receiving and transmitting signals in a wireless communication system.

Solution to Problem

In an aspect, a method of a user equipment (UE) receiving signals in a wireless communication system is provided. The method includes configuring a system mode and receiving the signals according to the system mode, wherein the system mode is either a first system mode or a second system mode, when the system mode is the first system mode, the signals are transmitted through a maximum of N transmit antennas, and when the system mode is the second system mode, the signals are transmitted through a maximum of M (N<M) transmit antennas.

In another aspect, an apparatus for wireless communications is provided. The apparatus includes a plurality of antennas and a processor coupled to the plurality of antennas and configured to configure a system mode and to transmit signals according to the system mode, wherein the system mode is either a single antenna mode or a multiple antenna mode, and the system mode is independently configured according to a format of the signals.

Advantageous Effects of Invention

A method and apparatus for receiving and transmitting signals in a wireless communication system are provided. Accordingly, the overall performance of the system can be improved.

MODE FOR THE INVENTION

The technique described below can be used in various multiple access schemes such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as Universal Terrestrial Radio Access (UTRA) or CDMA2000. The TDMA may be implemented with a radio technology such as Global System for Mobile communications (GSM)/General Packet Radio Service (GPRS)/Enhanced Data Rates for GSM Evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink and employs the SC-FDMA in uplink. LTE-advanced (LTE-A) is an evolution of the LTE.

For clarity, the following description will focus on the LTE (Release 8)/LTE-A (Release 10). However, the technical features of the present invention are not limited thereto.

Figure 1:
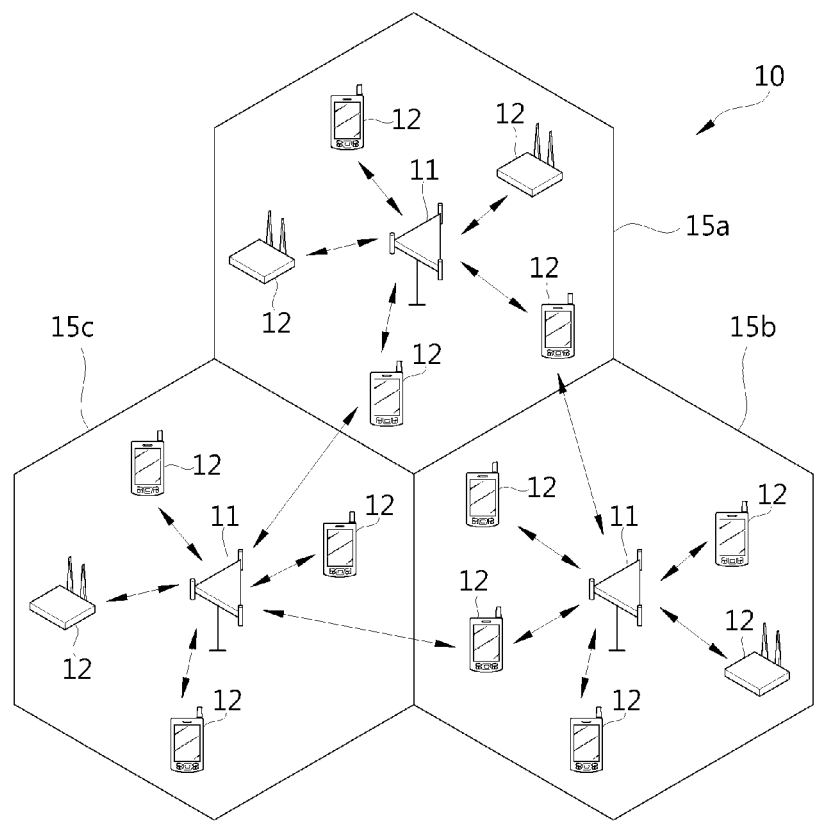
FIG. 1 is a block diagram showing a wireless communication system.

FIG. 1 is a block diagram showing a wireless communication system.

Referring to FIG. 1, a wireless communication system 10 includes at least one base station (BS) 11. The BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) denotes communication from the BS to the UE, and an uplink (UL) denotes communication from the UE to the BS. In the DL, a transmitter may be a part of the BS, and a receiver may be a part of the UE. In the UL, the transmitter may be a part of the UE, and the receiver may be a part of the BS.

The wireless communication system supports multi-antenna. The transmitter may use a plurality of transmit (Tx) antennas, and the receiver may use a plurality of receive (Rx) antennas. The Tx antenna is a logical or physical antenna used to transmit one signal or one stream, and the Rx antenna is a logical or physical antenna used to receive one signal or one stream. If the transmitter and the receiver use multi-antenna, the wireless communication system may be called as multiple input multiple output (MIMO) system.

A wireless communication process preferably is performed using a plurality of independent vertical layers rather than using a single layer. A structure having the plurality of vertical layers is referred to as a protocol stack. For the protocol stack, reference can be made to an open system interconnection (OSI) model which is a model for a widely known protocol structure in communication systems.

An UE to which an LTE system is applied (hereinafter referred to as an LTE UE) and an UE to which an LTE-A system is applied (hereinafter referred to as an LTE-A UE) can coexist within a cell. Accordingly, the LTE-A system must be designed to support both the LTE UE and the LTE-A UE. To this end, the LTE-A system may be designed to maintain reverse compatibility with the LTE system.

In the DL, an LTE system supports up to 4 transmit antennas, and an LTE-A system supports up to 8 transmit antennas. That is, an LTE UE can receive signals through a maximum of 4 transmit antennas. An LTE-A UE can receive signals through a maximum of 8 transmit antennas.

In the UL, an LTE system supports transmission for only a single antenna, and an LTE-A system supports transmission for multiple antennas. That is, an LTE UE can transmit signals through only a single antenna, and an LTE-A UE can transmit signals through multiple antennas.

For the purpose of channel measurement, information demodulation, etc. in a wireless communication system, there is a need for a signal which is known to both a BS and a UE. A signal known to both a BS and a UE is referred to as a reference signal (RS). The RS may also be referred to as a pilot. A RS for channel measurement must be transmitted to each transmit antenna because a channel is formed for every transmit antenna. An example of the RS for channel measurement can include a channel state information-RS (CSI-RS).

In the DL, although an LTE-A system supports transmission for a maximum of 8 transmit antennas, an LTE UE supports transmission for a maximum of 4 transmit antennas. Accordingly, a BS has only to transmit an RS for a maximum of 4 transmit antennas to LTE UEs. An RS structure in an LTE system is designed to allow channel estimation for a maximum of 4 transmit antennas. A BS, however, has to transmit an RS for a maximum of 8 transmit antennas to LTE-A UEs. That is, RS overhead for the LTE-A UEs is heavy.

Although LTE UEs and LTE-A UEs coexist within a cell, the LTE UEs may be a majority and the LTE-A UEs may be a minority. It is inefficient for a BS to send an RS for all 8 transmit antennas to the LTE-A UEs. In this case, if the LTE-A UE can operate like the LTE UE, inefficient overhead for the RS can be reduced. Accordingly, the throughput of the system can be generally increased.

A wireless communication system must be able to support both LTE-A UEs and LTE UEs. Here, a method of configuring an LTE-A system for such support becomes problematic. The LTE-A UEs operate in a more evolved manner than the LTE UEs. The LTE-A system, however, must be configured such that the LTE-A UEs can operate like the LTE UEs. To this end, different system modes, such as an LTE system mode and an LTE-A system mode, can be defined in the LTE-A system. Here, a control signaling method of instructing an LTE-A UE that the LTE-A UE will operate according to which one of the LTE system mode and the LTE-A system mode, a CSI feedback method for an LTE-A UE, and so on may become problematic.

Methods and apparatuses described hereinafter may be applied to not only LTE-A systems, but other systems.

UEs to which a first system is applied and UEs to which a second system is applied can coexist within a cell. The second system is an evolved system of the first system. For example, the first system may be an LTE system, and the second system may be an LTE-A system. As another example, the first system may be an IEEE 802.16e system, and the second system may be an IEEE 802.16m system.

The second system can be a system with an increased number of antennas as compared with the first system. The first system can support up to an A number of transmit antennas in the DL, and the second system can support up to a B number of transmit antennas in the DL (where B>A). The first system can support a C number of transmit antennas in the UL, and the second system can support a D number of transmit antennas in the UL (where D>C). For example, the first system may be an LTE system (A=4, C=1), and the second system may be an LTE-A system (B=8, D=4).

In some embodiments, the second system may be a system with an increased number of component carriers as compared with the first system. For example, the first system may support only a single carrier, and the second system may support multiple carriers.

In some embodiments, the second system can have an optimized form in which RSs are separated from each other based on information demodulation and channel measurement as compared with the first system. For example, the first system may be operated on the basis of a common RS (CRS) for information demodulation and channel measurement, and the second system may configure an RS through a combination of a demodulation-RS (DRS) for information demodulation and a CSI-RS for channel measurement.

To configure an LTE-A system in such a way as to support both LTE-A UEs and LTE UEs, an LTE system has to be first defined. The structure of a frame of an LTE system and a method of transmitting control information are described below with reference to FIGS. 2 to 9.

Figure 2:
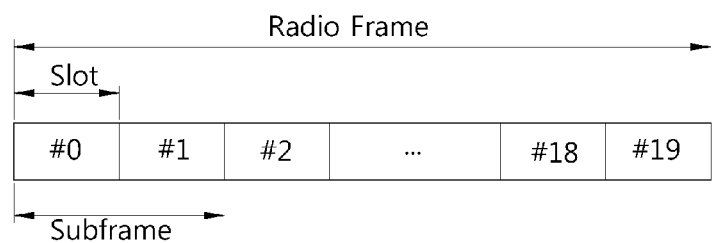
FIG. 2 shows an example of structure of a radio frame.

FIG. 2 shows an example of structure of a radio frame.

Referring to FIG. 2, the radio frame consists of 10 subframes. One subframe consists of two slots. Slots included in the radio frame are numbered with slot numbers #0 to #19. A time required to transmit one subframe is defined as a transmission time interval (TTI). The TTI is a scheduling unit for information transmission. For example, one radio frame may have a length of 10 milliseconds (ms), one subframe may have a length of 1 ms, and one slot may have a length of 0.5 ms. The structure of the radio frame is for exemplary purposes only, and thus the number of subframes included in the radio frame or the number of slots included in the subframe may change variously.

Figure 3:
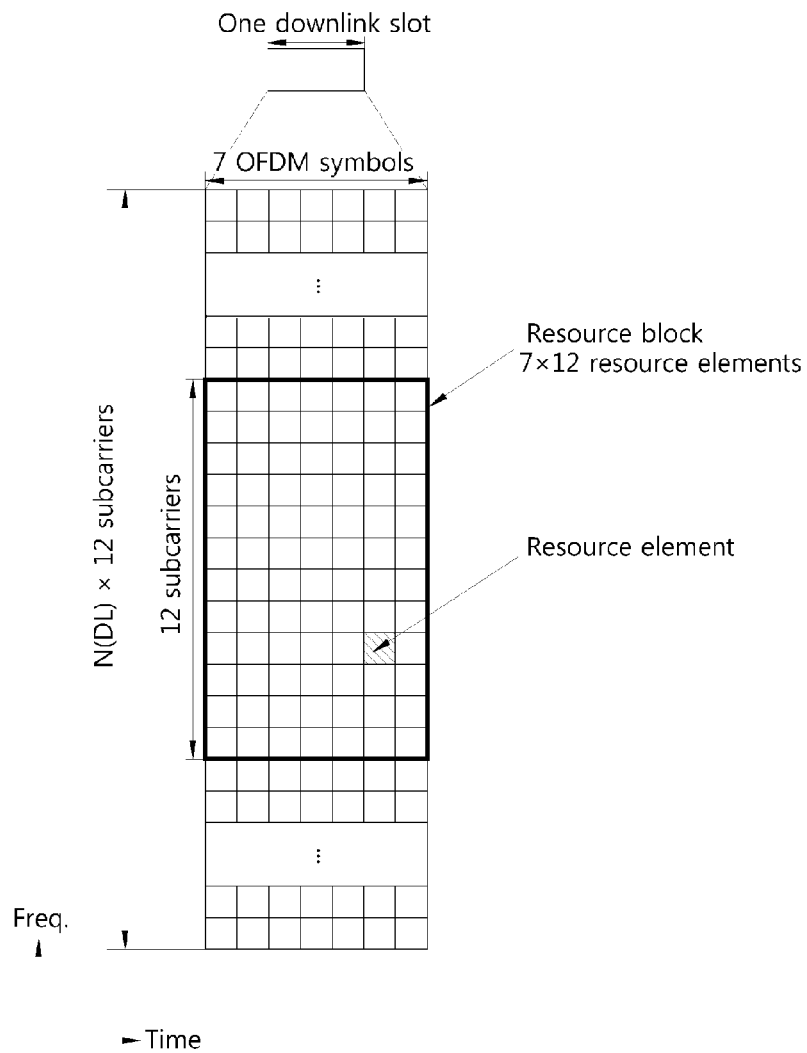
FIG. 3 shows an example of a resource grid for one downlink slot.

FIG. 3 shows an example of a resource grid for one downlink slot.

Referring to FIG. 3, the downlink slot includes a plurality of orthogonal frequency division multiplexing (OFDM) symbols in a time domain and N(DL) resource blocks in a frequency domain. The OFDM symbol is for expressing one symbol period, and may be referred to as an OFDMA symbol or a SC-FDMA symbol according to a multiple access scheme. The number N(DL) of resource blocks included in the downlink slot depends on a downlink transmission bandwidth configured in a cell. One resource block includes a plurality of subcarriers in the frequency domain.

Each element on the resource grid is referred to as a resource element. Although it is described herein that one resource block includes 7×12 resource elements consisting of 7 OFDM symbols in the time domain and 12 subcarriers in the frequency domain for example, the number of OFDM symbols and the number of subcarriers in the resource block are not limited thereto. Thus, the number of OFDM symbols and the number of subcarriers may change variously depending on a cyclic prefix (CP) length, a subcarrier spacing, etc. For example, when using a normal CP, the number of OFDM symbols is 7, and when using an extended CP, the number of OFDM symbols is 6.

The resource grid for one downlink slot of FIG. 3 can be applied to a resource grid for an uplink slot.

Figure 4:
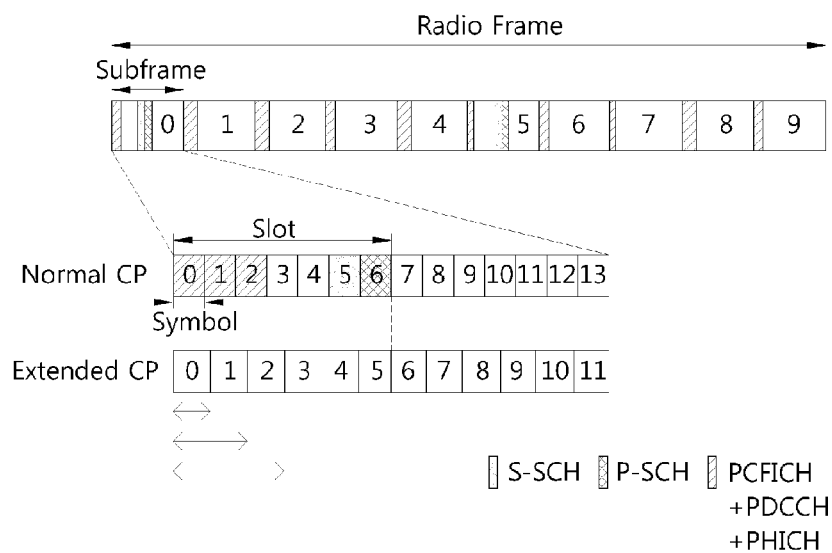
FIG. 4 shows a structure of a radio frame and a subframe in a frequency division duplex (FDD) system.

FIG. 4 shows a structure of a radio frame and a subframe in a frequency division duplex (FDD) system.

Referring to FIG. 4, the radio frame includes 10 subframes, and each subframe includes two consecutive slots. When using a normal CP, the subframe includes 14 OFDM symbols. When using an extended CP, the subframe includes 12 OFDM symbols. A synchronization channel (SCH) is transmitted in every radio frame.

The SCH is a channel for cell search. The cell search is a procedure by which a UE acquires time synchronization and frequency synchronization with a cell and detects a cell identifier (ID) of the cell. The SCH includes a primary (P)-SCH and a secondary (S)-SCH. The P-SCH is transmitted through a last OFDM symbol of a 1st slot of a subframe 0 and a subframe 5 in a radio frame. When using the normal CP, the P-SCH is an OFDM symbol 6 in the subframe, and when using the extended CP, the P-SCH is an OFDM symbol 5 in the subframe. The S-SCH is transmitted through an OFDM symbol located immediately before an OFDM symbol on which the P-SCH is transmitted.

Three OFDM symbols (i.e., OFDM symbols 0, 1, and 2) located in a front portion of a 1st slot in a subframe correspond to a control region. The remaining OFDM symbols correspond to a data region. A physical downlink shared channel (PDSCH) can be assigned to the data region. Downlink data is transmitted on PDSCH. Although the control region includes three OFDM symbols herein, this is for exemplary purposes only.

A physical downlink shared channel (PDSCH) can be assigned to the data region. Downlink data is transmitted on PDSCH.

Control channels such as a physical control format indicator channel (PCFICH), a physical HARQ (hybrid automatic repeat request) indicator channel (PHICH), a physical downlink control channel (PDCCH) etc., can be assigned to the control region.

The PCFICH carries information about the number of OFDM symbols used for transmission of PDCCHs in a subframe. The number of OFDM symbols used for PDCCH transmission may change in every subframe. According to an amount of control information, the number of OFDM symbols used for transmission of PDCCHs may be one (i.e., OFDM symbol 0), two (i.e., OFDM symbols 0 and 1), or three (i.e., OFDM symbols 0, 1 and 2). If the downlink transmission bandwidth is less than a specific threshold value, the number of OFDM symbols used for transmission of PDCCHs may be two (i.e., OFDM symbol 0 and 1), three (i.e., OFDM symbols 0, 1 and 2), or four (i.e., OFDM symbols 0, 1, 2 and 3).

The PHICH carries an HARQ acknowledgement (ACK)/not-acknowledgement (NACK) for uplink data.

The PDCCH carries downlink control information such as downlink scheduling information, uplink scheduling information, uplink power control command, or the like. The downlink scheduling information may be also referred to as a downlink grant, and the uplink scheduling information may be also referred to as an uplink grant.

The control region consists of a set of control channel elements (CCEs). The CCEs are indexed 0 to N(CCE)-1, where N(CCE) is the total number of CCEs constituting the set of CCEs in a downlink subframe. The CCE corresponds to a plurality of resource element groups. The resource element groups are used for defining the mapping of a control channel to resource elements. One resource element group includes a plurality of resource elements. A PDCCH is transmitted on an aggregation of one or several consecutive CCEs. A plurality of PDCCHs may be transmitted in the control region.

Figure 5:
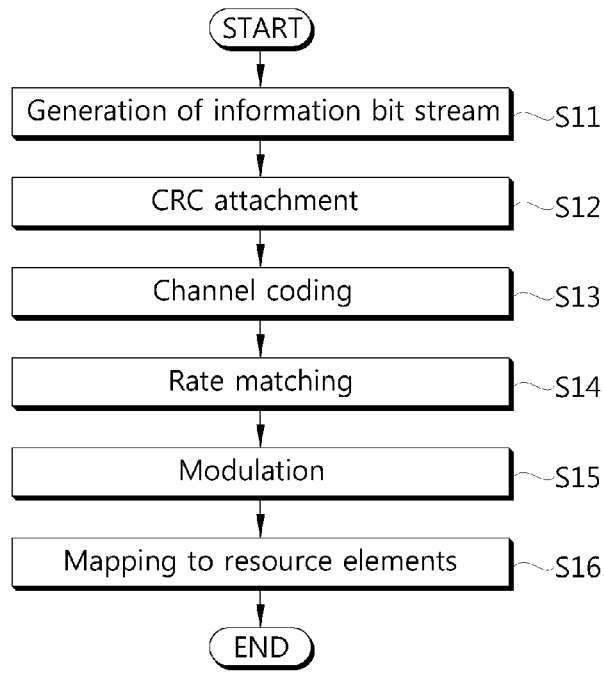
FIG. 5 is a flowchart illustrating an example of a method of transmitting DL control information over a PDCCH.

FIG. 5 is a flowchart illustrating an example of a method of transmitting DL control information over a PDCCH.

Referring to FIG. 5, a BS generates an information bit stream corresponding to DL control information (S11). The information bit stream can include one or more information fields in response to the DL control information.

In the case in which the DL control information is a DL grant, the information fields can include a resource allocation field indicative of time-frequency resources for transmitting DL data, an MCS field indicative of a modulation coding scheme (MCS) level of the DL data, etc. In the case in which the DL control information is an UL grant, the information fields can include a resource allocation field indicative of time-frequency resources for transmitting UL data, an MCS field indicative of an MCS level of the UL data, and so on.

The BS attaches a cyclic redundancy check (CRC) for error detection to the information bit stream (S12). The CRC can be masked with an identifier according to an owner of the DL control information or the use of the DL control information. In the case in which the DL control information is for a specific UE, the CRC can be masked with an UE identifier (ID) (i.e., a unique identifier of an UE). The UE ID is also referred to as a cell-radio network temporary identifier (C-RNTI). The CRC may also be masked with other identifier according to the use of the DL control information in addition to the UE ID.

The BS generates a coded bit stream by performing channel coding on the information bit stream to which the CRC has been attached (S13). The channel coding method is not specifically limited. For example, a convolution coding method may be used. The BS generates a rate matched bit stream by performing rate matching on the coded bit stream (S14). The BS generates modulation symbols by modulating the rate matched bit stream (S15). The BS maps the modulation symbols to resource elements (S16). The resource elements mapped to the modulation symbols correspond to PDCCHs (i.e., control channels for transmitting DL control information).

The BS may send the DL control information through a single antenna or multiple antennas. In the case in which the DL control information is sent through multiple antennas, the BS processes the modulation symbols according to an MIMO scheme and maps the processed modulation symbols to the resource elements for every antenna. The MIMO scheme may be a transmit diversity scheme.

A plurality of PDCCHs can be transmitted within one subframe. A BS does not provide an UE with information about where the PDCCHs of the UE are placed at which positions within a subframe. In general, in the state in which an UE does not know the positions of PDCCHs within a subframe, the UE finds the PDCCHs of the UE by monitoring a set of PDCCH candidates for every subframe. Here, the term "monitoring" refers to an action to attempt decoding PDCCH candidates. This is referred to as blind decoding or blind detection. If, after the UE damasks the UE ID of a PDCCH candidate, CRC error is not detected through a CRC test, it is meant that the UE has detected the PDCCH candidate as a PDCCH of the UE.

To receive DL data, an UE can first detect a PDCCH in which a DL grant is transmitted through blind decoding. The UE can receive the DL data on the basis of the DL grant. To transmit UL data, an UE can first detect a PDCCH in which an UL grant is transmitted through blind decoding. The UE can transmit the UL data on the basis of the UL grant.

Figure 6:
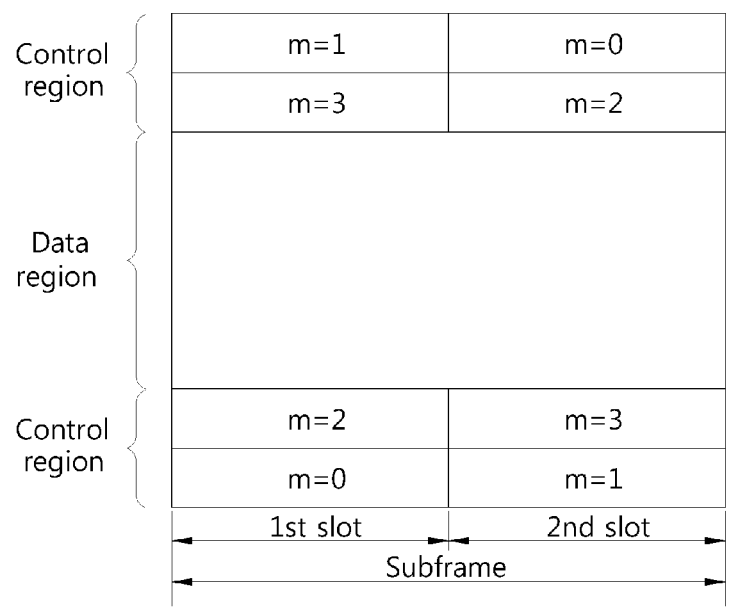
FIG. 6 shows an example of the structure of an UL subframe.
Figure 6:
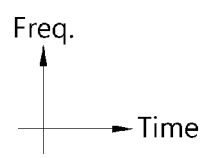

FIG. 6 shows an example of the structure of an UL subframe.

Referring to FIG. 6, the UL subframe can be divided into a control region in which physical uplink control channels (PUCCHs) carrying UL control information are allocated and a data region in which physical uplink shared channels (PUSCHs) carrying UL data are allocated.

UL data transmitted on the PUSCHs may include user data, control information, information in which several pieces of control information are mixed, or multiplexed information of control information and user data.

The UL control information transmitted on the PUCCHs may include HARQ ACK/NACK messages, a CSI indicative of a DL channel state, a scheduling request (SR) (i.e., an UL radio resource allocation request), and the like. The CSI refers to common information about DL channels, but it is not specifically limited. The CSI may include at least one of a channel quality indicator (CQI), a precoding matrix indicator (PMI), and a rank indicator (RI). The CQI indicates an MCS level appropriate for a channel. The PMI indicates a codebook index appropriate for a channel. The RI indicates the rank of a channel.

PUCCHs for one UE are allocated in the form of a resource block (RB) pair in a subframe. Resource blocks belonging to the resource block pair occupy different subcarriers in each of a first slot and a second slot. This is said that a RB pair allocated to PUCCHs is subject to frequency hopping at the slot boundary. m is a position index, indicating a frequency domain position of the resource block pair allocated to the PUCCHs within the subframe.

Uplink transmission of an UE can be classified into three types as follows. (1) UL data transmission on PUSCHs (hereinafter referred to as PUSCH transmission), (2) UL control information transmission on PUCCHs (hereinafter referred to as PUCCH transmission), and (3) sounding reference signal (SRS) transmission.

Figure 7:
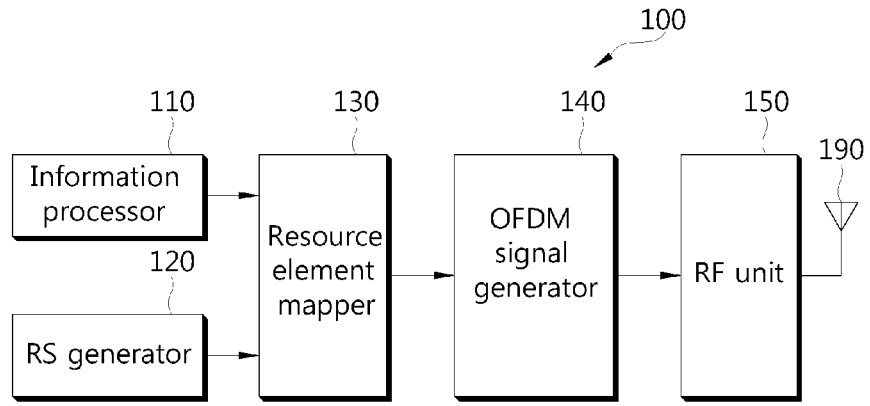
FIG. 7 is a block diagram showing an example of the structure of a transmitter comprising a single antenna.

FIG. 7 is a block diagram showing an example of the structure of a transmitter comprising a single antenna. Here, the transmitter may be part of an UE.

Referring to FIG. 7, the transmitter 100 includes an information processor 110, an RS generator 120, a resource element mapper 130, an OFDM signal generator 140, a radio frequency (RF) unit 150, and a transmit antenna 190.

The information processor 110 and the RS generator 120 are coupled to the resource element mapper 130. The resource element mapper 130 is coupled to the OFDM signal generator 140, the OFDM signal generator 140 is coupled to the RF unit 150, and the RF unit 150 is coupled to the transmit antenna 190.

The information processor 110 receives information. The information may be control information or data. The information may have a form of a bit or a bit stream. The transmitter 100 may be implemented in a physical layer. In this case, the received information may originate from a higher layer, such as a medium access control (MAC) layer.

The information processor 110 is configured to generate an information sequence (i.e., a plurality of information symbols) based on the received information. The information symbols may be complex-valued symbols acquired by processing information.

The RS generator 120 generates an RS sequence (i.e., a plurality of RS symbols). The RS symbols may be complex-valued symbols.

The RS sequence can be a cyclically shifted sequence. The cyclically shifted sequence can be generated by cyclically shifting a base sequence as much as a specific cyclic shift (CS) amount. Various kinds of sequences may be used as the base sequence. For example, a well-known sequence, such as a pseudo-random (PN) sequence or Zadoff-Chu (ZC) sequence, may be used as the base sequence. In some embodiments, a constant amplitude zero auto-correlation (CAZAC) generated by a computer may be used as the base sequence. It is to be noted that a specific sequence can be use as the RS sequence without special restrictions.

The RS generator 120 can generate a demodulation (DM) RS sequence or an SRS sequence. The DM RS is an RS which is used to demodulate information in a BS. The DM RS includes a DM RS for PUSCHs and a DM RS for PUCCHs.

The SRS sequence is an RS which is transmitted from an UE to a BS for the purpose of UL scheduling. The BS estimates an UL channel based on the received SRS and uses the estimated UL channel for UL scheduling.

The SRS sequence can be transmitted through one OFDM symbol within a subframe. For example, the SRS sequence may be transmitted through the last one of OFDM symbols constituting a subframe. The above example is only illustrative, and the positions or the number of OFDM symbols in which the SRS sequence is transmitted within a subframe may be changed variously. The SRS sequence is not transmitted in the control region, but is transmitted in the data region. An UE may send the SRS sequence over the entire frequency (or all subcarriers) of the data region or can send the SRS sequence over some of the frequency of the data region. In the case in which an UE sends the SRS sequence over some of the frequency, the SRS sequence can be transmitted while hopping to other frequency every subframe. Further, an UE may send the SRS sequence using subcarriers having even-numbered or odd-numbered subcarrier indices. An UE may cyclically send the SRS sequence.

The SRS sequence may be a cyclically shifted sequence. The SRS sequences for a plurality of respective UEs within a cell may be multiplexed using different subframes, different subcarriers, or different CS amounts in which the SRS sequences are transmitted.

The resource element mapper 130 is configured to map the information sequence or the RS sequence or both to resource elements allocated thereto for the purpose of UL transmission. Each of the information symbol and the RS symbol may be mapped to one resource element.

The OFDM signal generator 140 is configured to generate a time-continuous OFDM signal for each OFDM symbol. The time-continuous OFDM signal is also referred to as an OFDM baseband signal. The OFDM signal generator 140 can generate the OFDM signal through the execution of inverse fast Fourier transform (IFFT), the insertion of a CP, etc. for each OFDM symbol.

The RF unit 160 converts the OFDM baseband signal into a radio signal. The OFDM baseband signal may be up-converted into a carrier frequency and converted into the radio signal. The carrier frequency is also referred to as a center frequency. A single carrier is used in an LTE system. The radio signal is transmitted through the transmit antenna 190.

Figure 8:
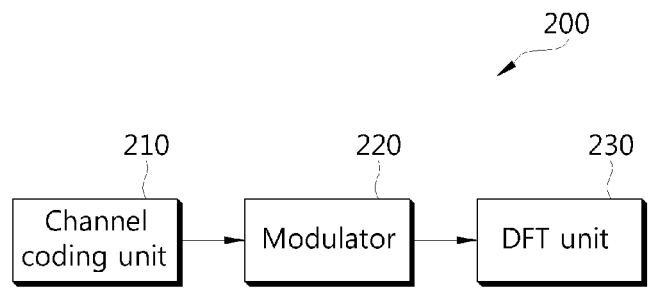
FIG. 8 is a block diagram showing an example of the information processor shown in FIG. 7.

FIG. 8 is a block diagram showing an example of the information processor shown in FIG. 7.

Referring to FIG. 8, the information processor 200 includes a channel coding unit 210, a modulator 220, and a discrete Fourier transform (DFT) unit 230. The channel coding unit 210 is coupled to the modulator 220, and the modulator 220 is coupled to the DFT unit 230. The DFT unit 230 is coupled to the resource element mapper (refer to 130 of FIG. 7). The information processor 200 can generate an information sequence by processing UL data transmitted on PUSCHs.

The channel coding unit 210 is configured to receive an information bit stream corresponding to UL data and to generate coded bits by performing channel coding on the information bit stream. The channel coding method is not specifically limited. For example, a turbo coding method, a convolution coding method, or a block coding method may be used as the channel coding method. An example of a block code includes a Reed-Muller code family. The coded bits outputted from the channel coding unit 210 may have various sizes.

The channel coding unit 210 can generate rate matched bits by performing rate matching on the coded bits. Hereinafter, the coded bits may refer to rate matched bits.

The modulator 220 is configured to generate a modulation symbol by mapping the coded bits to a symbol which represents a position on the signal constellation. The modulation scheme is not specifically limited. For example, an m-phase shift keying (m-PSK) scheme or an m-quadrature amplitude modulation (m-QAM) scheme may be used as the modulation scheme. The number of modulation symbols may be one or plural. The number of modulation symbols may be various depending on the amount and a modulation scheme of the coded bits inputted to the modulator 220.

The DFT unit 230 is configured to output complex-valued symbols by performing a DFT on the modulation symbols outputted from the modulator 220. The complex-valued symbols outputted from the DFT unit 230 may be an information sequence.

The resource element mapper (refer to 130 of FIG. 7) maps the information sequence, outputted from the DFT unit 230, to resource elements within a resource block allocated for PUSCH transmission. Here, the resource block for PUSCH transmission may be allocated through an UL grant. The OFDM signal generator (refer to 140 of FIG. 7) may also be referred to as an SC-FDMA signal generator.

In the case in which the UL grant includes a CSI requester, an UE can send a CSI or information in which a CSI and user data are multiplexed on the PUSCH. Accordingly, in an LTE system, CSI feedback on the PUSCH is non-cyclic.

Figure 9:
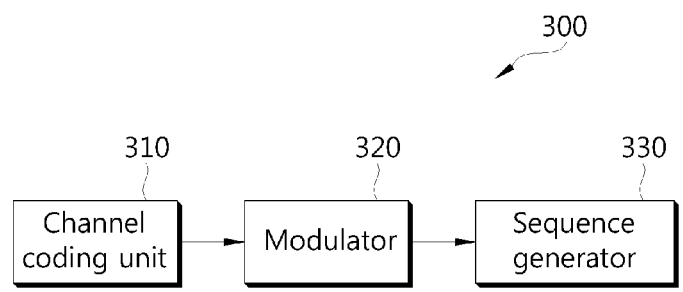
FIG. 9 is a block diagram showing an example of the information processor shown in FIG. 7.

FIG. 9 is a block diagram showing another example of the information processor shown in FIG. 7.

Referring to FIG. 9, the information processor 300 includes a channel coding unit 310, a modulator 320, and a sequence generator 330. The channel coding unit 310 is coupled to the modulator 320, and the modulator 320 is coupled to the sequence generator 330. The sequence generator 330 is coupled to the resource element mapper (refer to 130 of FIG. 7). The information processor 300 can generate an information sequence by processing UL control information transmitted on the PUCCH.

The channel coding unit 310 is configured to receive an information bit stream corresponding to UL control information and to generate coded bits by performing channel coding on the information bit stream.

The modulator 320 is configured to generate a modulation symbol by mapping the coded bits to a symbol which represents a position on the signal constellation. In the case in which the UL control information is an SR or HARQ ACK/NACK messages, the modulator 320 may output one modulation symbol $d(0)$. In the case in which the UL control information is a CSI, the modulator 320 may output 10 modulation symbols $d(0), \ldots, d(9)$.

The sequence generator 330 is configured to generate an information sequence (i.e., a sequence spread on the basis of the modulation symbol and a sequence). The sequence is not specifically limited. However, the sequence may be selected from sequences which are orthogonal to each other or which have a low correlation.

The resource element mapper (refer to 130 of FIG. 7) maps the information sequence, outputted from the sequence generator 330, to resource elements within a resource block allocated for PUCCH transmission. Here, the resource block for PUCCH transmission is allocated in the form of an RB pair (refer to FIG. 6).

The information sequence generated by the sequence generator 330 is described below.

The information sequence can be divided into a 1-dimension spreading sequence and a 2-dimension spreading sequence.

(1) 1-Dimension Spreading Sequence

The 1-dimension spreading sequence is generated on the basis of a modulation symbol and a first sequence. In the case of PUCCH formats 2/2a/2b, the 1-dimension spreading sequence may be used as an information sequence. The PUCCH format 2 is used to transmit a CSI, and the PUCCH formats 2a/2b are used to transmit a CSI and HARQ ACK/NACK messages. A method of generating the 1-dimension spreading sequence based on, for example, modulation symbols $d(0), \ldots, d(9)$ is described below.

The modulation symbol $d(k)$ is spread into a first sequence $r(k,n)$ having a length N, resulting in the generation of a 1-dimension spreading sequence $s(k,n)$ ($k=0, \ldots, 9$, $n=0, \ldots, N-1$). Here, k corresponds to a symbol index which indicates the position of an OFDM symbol within a subframe. Accordingly, $d(k)$ corresponds to one OFDM symbol within the subframe according to k. n corresponds to a subcarrier index which indicates the position of a subcarrier within the subframe. Accordingly, $(k,n)$ corresponds to one resource element within the subframe.

The first sequence $r(k,n)$ may be a cyclically shifted sequence. In this case, a CS amount of the first sequence $r(k,n)$ has to be determined. The first sequence $r(k,n)$ may have a different CS amount according to k.

The following equation is an example of generating the 1-dimension spreading sequence $s(k,n)$.

MathFigure 1

$$s(k,n)=d(k)r(k,n) \qquad [\text{Math.1}]$$

$s(k,n)$ is a 1-dimension spreading sequence corresponding to an OFDM symbol within a subframe corresponding to k, and it can be expressed as follows.

$\{s(0,n), s(1,n), \ldots, s(9,n)\} = \{d(0)r(0,n), d(1)r(1,n), \ldots, d(9)r(9,n)\}$ The resource element mapper (refer to 130 of FIG. 7) maps the 1-dimension spreading sequence $s(k,n)$ to a resource element corresponding to $(k,n)$ within a subframe.

In the case of PUCCH formats 2/2a/2b, a CS amount of a first sequence (i.e., a cyclically shifted sequence) and a resource block allocated for PUCCH transmission have to be determined. In other words, (1) the CS amount and (2) the resource block are resources used for PUCCH transmission.

A resource index is used to identify resources used for PUCCH transmission. Resources are determined based on the resource index. An UE can determine a CS amount and a resource block based on the resource index. The CS amount determined based on the resource index may be hopped to an OFDM symbol level. A resource index for a CSI may be semi-statically configured by a higher layer signaling, such as a radio resource control (RRC) signaling.

(2) 2-Dimension Spreading Sequence

The 2-dimension spreading sequence is generated on the basis of a 1-dimension spreading sequence and a second sequence. That is, the 2-dimension spreading sequence is generated on the basis of a modulation symbol, a first sequence, and a second sequence. In the case of PUCCH formats 1/1a/1b, the 2-dimension spreading sequence can be used as an information sequence. The PUCCH format 1 is used to send the SR, and the PUCCH formats 1a/1b are used to send HARQ ACK/NACK messages. A method of generating the 2-dimension spreading sequence based on, for example, a modulation symbol $d(0)$ is described below.

The modulation symbol $d(0)$ is spread into a first sequence $r(k,n)$ having a length N, resulting in the generation of a 1-dimension spreading sequence $s(k,n)$ ($k=0, \ldots, K-1$, $n=0, \ldots, N-1$). Here, k corresponds to a symbol index which indicates the position of an OFDM symbol within a subframe or a slot, and K may be the number of OFDM symbols to which an information sequence is mapped within the subframe or the slot. In typical PUCCH formats 1/1a/1b, the number of OFDM symbols to which an information sequence is mapped within a slot is 4. It is hereinafter assumed that the number of OFDM symbols is 4 (i.e., K=4). $s(k,n)$ corresponds to one OFDM symbol within a slot according to k. n corresponds to a subcarrier index which indicates the position of a subcarrier within the slot. Accordingly, $(k,n)$ corresponds to one resource element within the slot.

The first sequence $r(k,n)$ may be a cyclically shifted sequence. In this case, a CS amount of the first sequence $r(k,n)$ has to be determined. A CS amount of the first sequence $r(k,n)$ may vary depending on k.

The following equation is an example of generating the 1-dimension spreading sequence s(k,n).

MathFigure 2

$$s(k,n)=d(0)x(k,n), k=0,\ldots,3 \quad [\text{Math.2}]$$

s(k,n) is a 1-dimension spreading sequence corresponding to an OFDM symbol within a slot corresponding to k, and it can be expressed as follows.

{s(0,n), s(1,n), s(2,n), s(3,n)}={d(0)r(0,n), d(0)r(1,n), d(0)r(2,n), d(0)r(3,n)}

The 1-dimension spreading sequence s(k,n) can be spread into a second sequence w(k) having a length 4 (k is an element index of the second sequence, k=0, . . . , 3), resulting in the generation of a 2-dimension spreading sequence z(k,n). The second sequence w(k) may be selected from a sequence set including a plurality of sequences as elements. The plurality of sequences included in the sequence set may be orthogonal to each other or may have a low correlation.

It is hereinafter assumed that the second sequence is an orthogonal sequence selected from an orthogonal sequence set including sequences orthogonal to each other. Each of the orthogonal sequences belonging to the orthogonal sequence set corresponds to one orthogonal sequence index (hereinafter referred to as a Ios). In this case, the Ios of the second sequence w(k) has to be determined. The Ios of the second sequence w(k) may vary depending on a slot number within a radio frame.

The following equation is an example of generating the 2-dimension spreading sequence z(k,n).

MathFigure 3

$$z(k,n)=w(k)s(k,n)=w(k)d(0)x(k,n), k=0,\ldots,3 \quad [\text{Math.3}]$$

z(k,n) is a 2-dimension spreading sequence corresponding to an OFDM symbol within a slot corresponding to k, and it can be expressed as follows.

{z(0,n), z(1,n), z(2,n), z(3,n)}
={w(0)d(0)r(0,n), w(1)d(0)r(1,n), w(2)d(0)r(2,n), w(3)d(0)r(3,n)}

The resource element mapper (refer to 130 of FIG. 7) maps the 2-dimension spreading sequence z(k,n) to a resource element corresponding to (k,n) within a slot.

In the case of the PUCCH formats 1/1a/1b, a CS amount of the first sequence (i.e., a cyclically shifted sequence), an Ios of the second sequence (i.e., an orthogonal sequence), and a resource block allocated for PUCCH transmission have to be determined. In other words, (1) the CS amount, (2) the Ios, and (3) the resource block are resources used for PUCCH transmission.

A resource index is used to identify resources used for PUCCH transmission. Resources are determined based on the resource index. An UE can determine a CS amount, an Ios, and a resource block based on the resource index. The CS amount determined based on the resource index may be hopped to an OFDM symbol level. The Ios determined based on the resource index may be hopped to a slot level.

A resource index for an SR or semi-persistent scheduling (SPS) ACK/NACK messages may be semi-statically set by a higher layer signaling, such as an RRC signaling. The SPS ACK/NACK messages are ACK/NACK messages for DL data transmitted through semi-static scheduling. In the case in which DL data are transmitted through a PDSCH, a PDCCH corresponding to the PDSCH may not exist.

A resource index for dynamic ACK/NACK messages may be implicitly set. The dynamic ACK/NACK messages are ACK/NACK messages for DL data transmitted through dynamic scheduling. In such dynamic scheduling, whenever a BS sends DL data through a PDSCH, the BS sends a DL grant to an UE through the PDCCH.

The resource index for the dynamic ACK/NACK messages can be acquired from radio resources in which PDCCHs are transmitted. For example, radio resources in which PDCCHs are transmitted may be CCEs, and the resource index may be acquired from the first CCE index used for PDCCH transmission.

UL transmission in an LTE system has been described above. UL transmission in the LTE system has the following characteristics.

(1) In UL transmission, only transmission for a single antenna is supported.

(2) Resource blocks allocated to one UE for PUSCH transmission are continuous in the frequency domain.

(3) One UE is not allowed to send PUCCHs and PUSCHs at the same time.

(4) A CSI may be cyclically transmitted on the PUCCH or may be non-cyclically transmitted on the PUSCH.

In the UL transmission of an LTE system, a single carrier property can be maintained through the characteristics (2) and (3).

The structure of a frame and the method of sending signals in an LTE system have been described above.

To configure an LTE-A system supporting both an LTE UE and an LTE-A UE, the frame of an LTE-A system may have the same basic structure as an LTE system.

Each of 10 subframes within one radio frame may have a subframe type defined according to its use. For example, each of subframes within a radio frame may have a subframe type which is defined according to conditions, such as a LTE-only subframe, a mixed subframe, and an LTE-A-only subframe. The LTE-only subframe is suitably designed for an LTE UE group, the LTE-A-only subframe is suitably designed for an LTE-A UE group, and the mixed subframe is suitably designed for both an LTE UE group and an LTE-A UE group.

The performance of the system may be deteriorated in the UEs of other UE groups because each of the subframes is suitably designed for a specific UE group. In order for an LTE-A UE not to have disadvantages in resource allocation in an LTE-A system, the LTE-A UE has to be configured to receive signals in all the subframe types. Accordingly, the LTE-A UE must be able to operate in the same manner as an LTE UE to which an LTE system is applied even in an LTE-A system according to conditions.

A method of operating an LTE-A UE in the same manner as an LTE UE is described below.

Figure 10:
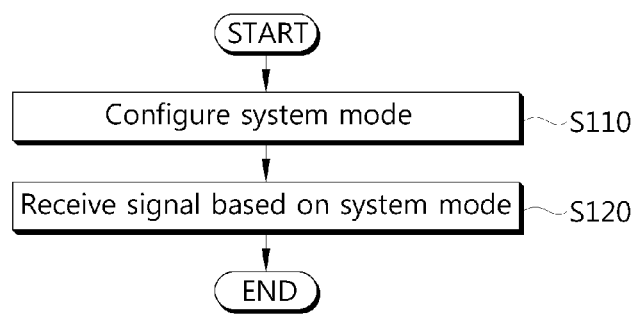
FIG. 10 is a flowchart illustrating a method of receiving signals which is performed by an LTE-A UE.

FIG. 10 is a flowchart illustrating a method of receiving signals which is performed by an LTE-A UE.

Referring to FIG. 10, the LTE-A UE configures a system mode (S110). The system mode is one of an LTE system mode and an LTE-A system mode. The LTE-A UE receives signals according to the configured system mode (S120). In the case in which the system mode is the LTE system mode, the signals can be transmitted through a maximum of 4 transmit antennas. In the case in which the system mode is the LTE-A system mode, the signals can be transmitted through a maximum of 8 transmit antennas. The LTE-A UE can receive a DL grant and receive the signals based on the DL grant.

Figure 11:
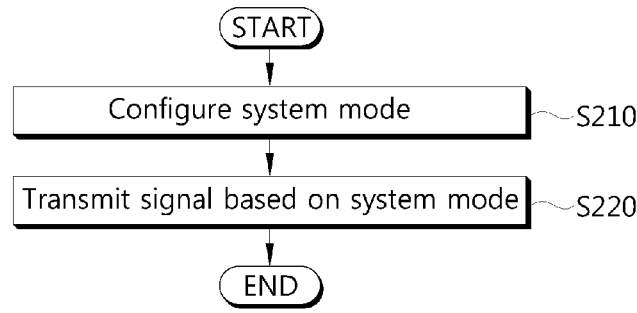
FIG. 11 is a flowchart illustrating a method of transmitting signals which is performed by an LTE-A UE.

FIG. 11 is a flowchart illustrating a method of transmitting signals which is performed by an LTE-A UE.

Referring to FIG. 11, the LTE-A UE configures a system mode (S210). The system mode is one of an LTE system mode and an LTE-A system mode. The LTE-A UE sends signals according to the configured system mode (S220). In the case in which the system mode is the LTE system mode, the signals can be transmitted through a single antenna. In the case in which the system mode is the LTE-A system mode, the signals can be transmitted through multiple antennas. Hereinafter, in the UL, the LTE system mode may be referred to as a single antenna mode, and the LTE-A system mode may be referred to as a multiple antenna mode.

In an LTE-A system, a different system mode, such as the LTE system mode or the LTE-A system mode, may be defined. An LTE-A UE may be operated according to a different system mode, such as the LTE system mode or the LTE-A system mode. If the system mode is configured as the LTE system mode, the LTE-A UE is operated according to the LTE system mode. If the system mode is configured as the LTE-A system mode, the LTE-A UE is operated according to the LTE-A system mode.

The system mode may be independently set in each of the DL and the UL. For example, the DL may be configured as the LTE system mode, and the UL may be configured as the LTE-A system mode. In this case, an UE can receive a DL signal according to the LTE system mode and transmit an UL signal according to the LTE-A system mode.

In some embodiments, the system mode may be generally configured. In the case in which the system mode is configured as the LTE system mode, an LTE-A UE is operated according to the LTE system mode in both the DL and the UL.

A method of configuring the system mode of an LTE-A UE is described below.

A BS can inform the LTE-A UE of the system mode explicitly or implicitly. The LTE-A UE configures the system mode according to the instruction of the BS. The BS can explicitly inform the LTE-A UE of the system mode through a physical layer signaling or a higher layer signaling, such as an RRC signaling.

A method of a BS informing an LTE-A UE of the system mode is described below.

1. Dynamic System Mode Switching

The BS may inform an LTE-A UE of the system mode such that the LTE-A UE is operated according to an LTE system mode during a specific period of time. Here, the specific period of time may be a specific subframe or a specific radio frame. In this case, in the LTE-A UE, the system mode may be dynamically switched. That is, the system mode may be changed every subframe. The BS can inform the LTE-A UE of the system mode through the above-described method.

(1) Use of Multiple UE IDs

A number of UE IDs may be allocated to one LTE-A UE. Each of the UE IDs may inform the LTE-A UE of the system mode on which the LTE-A UE has to be operated. The LTE-A UE configures the system mode according to the UE ID.

For example, it is assumed that a first UE ID UE ID #1 and a second UE ID UE ID #2 have been allocated to one LTE-A UE, the first UE ID indicates the LTE mode, and the second UE ID indicates the LTE-A mode. The LTE-A UE damasks the first UE ID and the second UE ID at the PDCCH candidate of each subframe and determines whether CRC error exists by performing a CRC test. If CRC error is not detected after demasking the first UE ID, the LTE-A UE sets the LTE system mode as the system mode. As described above, the LTE-A UE can know the system mode on which it has to be operated by checking an UE ID that has been masked to the CRC of a PDCCH candidate within each subframe.

In the case in which a DL grant is transmitted on a PDCCH, an LTE-A UE can receive DL data according to the system mode indicated by an UE ID. In the case in which an UL grant is transmitted on a PDCCH, an LTE-A UE can send UL data according to the system mode indicated by an UE ID.

(2) Use of Higher Layer Signaling

A BS can inform an LTE-A UE of the system mode such that the LTE-A UE is operated according to the LTE system mode in a specific subframe or a specific radio frame through a higher layer signaling. The higher layer signaling may be an RRC signaling.

The higher layer signaling can include subframe information indicative of a subframe which is set to the LTE system mode. The LTE-A UE sets the system mode based on the subframe information. The higher layer signaling can further include supplementary information, such as information about a transmission scheme, in addition to the subframe information. The transmission scheme can include a single antenna scheme, an MIMO scheme, and so on. The MIMO scheme can include a transmit diversity scheme, an open-loop space multiplexing scheme, a closed-loop space multiplexing scheme, etc. The transmission scheme can be a scheme which a BS sends DL data to an LTE-A UE. Alternatively, the transmission scheme can be a scheme which an LTE-A UE sends UL data to a BS.

(3) Broadcasting PDCCH

A BS can send a broadcasting PDCCH for an LTE-A UE. The broadcasting PDCCH may be sent every subframe or may be sent in the subframe of a specific position within one radio frame. Control information transmitted on the broadcasting PDCCH can include subframe information indicating a subframe which is set to the LTE system mode. The LTE-A UE sets the system mode on the basis of the subframe information.

All LTE-A UE which are operated in the subframe sent by the broadcasting PDCCH can read the broadcasting PDCCH. An identifier which are in common to all LTE-A UEs within a cell and are configured to inform the broadcasting PDCCH can be masked to the CRC of the broadcasting PDCCH.

2. Semi-Static System Mode Switching

Each LTE-A UE can semi-statically set the system mode. System mode information indicating the semi-static system mode switching can be sent through a higher layer signaling, such as an RRC signaling. Alternatively, the system mode information may be sent through other form of a control signaling. The system mode information can be used to differently indicate the system mode for DL and the system mode for UL. For example, a BS may semi-statically set the system mode so that an LTE-A UE is operated in the LTE system mode in the DL and is operated in the LTE-A system mode in the UL. For another example, a BS may semi-statically set the system mode so that an LTE-A UE is operated in the LTE system mode in the UL and operated in the LTE-A system mode in the DL. In the case in which the LTE-A UE is configured as operated in the LTE system mode in the UL or the DL or both, if a number of transmit channels exist, only a specific one of the transmit channels can be configured as operated in the LTE system mode.

A method of a BS implicitly informing an LTE-A UE of the system mode is described in detail.

1. Scheduling to LTE-Only Subframe

An LTE-A UE can be allocated to a subframe which is defined as an LTE-only subframe. Here, the LTE-A UE is naturally operated according to the LTE system mode in the LTE-only subframe.

In the case in which the LTE-A UE is operated in the LTE system mode, how DL data can be received by the LTE-A UE using which transmission scheme may become problematic.

First, the LTE-A UE may use a predetermined transmission scheme or a transmission scheme determined according to a default mode.

Second, a transmission scheme set for the LTE-A UE may be used without change. Here, an MIMO scheme for the four transmit antennas of an LTE system is used. A BS can determine information about an MIMO channel, such as a PMI and an RI. The BS can send the information about the MIMO channel through a PDCCH.

When the LTE-A UE is operated in the LTE system mode, a method of the LTE-A UE detecting a PDCCH may become problematic.

First, the LTE-A UE may receive a DL grant on a PDCCH using an LTE system method and receive DL data on a PDSCH using the LTE system method. In this case, a BS may configure the PDCCH so that it has the same size and structure as that of the LTE system and send the configured PDCCH to the LTE-A UE.

Second, the LTE-A UE may receive the DL grant on the PDCCH using the LTE-A system method and receive only the DL data on the PDSCH using the LTE system method.

Third, the LTE-A UE may receive the DL grant on the PDCCH using the LTE system method or the LTE-A system method according to conditions.

2. SPS Scheduling

In the case in which resources are allocated to an LTE-A UE according to an SPS scheduling method, the LTE-A UE may configure an LTE system mode as the system mode and operate in the LTE system mode. Here, the system mode of the LTE-A UE may vary semi-statically.

In the case in which data are Voice over IP (VoIP), the SPS scheduling method may be used. In the case in which resources for DL reception are allocated to an LTE-A UE according to the SPS scheduling method, the LTE-A UE may receive DL data although it does not receive a DL grant on a PDCCH every subframe. The LTE-A UE may receive the DL data in a predetermined resource block within a specific subframe. In the case in which resources for UL transmission are allocated to an LTE-A UE according to the SPS scheduling method, the LTE-A UE may send UL data although it does not receive an UL grant on a PDCCH.

The SPS scheduling method is not subject to link adaptation according to a channel for every subframe. The term "link adaptation" refers to that the MCS level is differently used according to channels when data are transmitted. That is, if the SPS scheduling method is used, an optimized transmission scheme is difficult to be applied to a channel. Accordingly, in the case in which resources are allocated to an LTE-A UE according to the SPS scheduling method, the LTE-A UE preferably is configured as operated according to the LTE system mode.

3. Transmission Scheme

An LTE-A UE may configure the system mode based on a transmission scheme set for an UE. When a specific transmission scheme is set for the LTE-A UE, the LTE-A UE can immediately configure the LTE system mode as the system mode. For example, if an open-loop transmission scheme is set for an LTE-A UE, the LTE system mode may be immediately configured as the system mode. For another example, if a transmit diversity transmission scheme is set for an LTE-A UE, the LTE system mode may be immediately configured as the system mode.

The system mode of an LTE-A UE can be semi-statically changed because the transmission scheme is semi-statically set.

In a specific transmission scheme, the LTE system mode is always configured as the system mode of an LTE-A UE. Thus, a CSI of the corresponding transmission scheme can also be fed back like an LTE. Alternatively, in a specific transmission scheme, the LTE system mode is configured as the system mode of an LTE-A UE, but a CSI of the corresponding transmission scheme may be fed back so that better performance is provided.

4. Multi-Carrier Support

An LTE-A system supports multiple carriers. It is assumed that one LTE-A UE uses a plurality of component carriers allocated thereto. The LTE-A UE may set the system mode according to the component carriers. The LTE-A UE may be configured as operated in the LTE system mode in some of the component carriers. For example, if four component carriers are allocated to one LTE-A UE, the LTE-A UE may be configured as operated in the LTE system mode in two of the four component carriers and to be operated in the LTE-A system mode in the remainder of the four component carriers.

At least one of a plurality of component carriers may be an LTE-only component carrier. An LTE-A UE is operated only in the LTE system mode in the LTE-only component carrier. Which one of the component carriers will be set as the LTE-only component carrier can be previously defined between a BS and the LTE-A UE. In some embodiments, a BS may inform an LTE-A UE that which one of component carriers will be set as the LTE-only component carrier through signaling.

As described above, the system mode may vary dynamically or semi-statically. A case in which the system mode is semi-statically changed is described below. While the system mode is configured as the LTE system mode, an LTE-A UE can receive DL data based on the LTE system mode. Further, the LTE-A UE can send UL data based on the LTE system mode.

Here, a method of the LTE-A UE feeding back a CSI becomes problematic. This is because a CSI for an LTE system differs from a CSI for an LTE-A system. The LTE system and the LTE-A system have different feedback CSIs because they have different maximum ranks, different precoding matrices, etc. It is assumed that the CSI for an LTE system is referred to as an LTE CSI and the CSI for an LTE-A system is referred to as an LTE-A CSI, for convenience of description. In the case in which the LTE system mode is configured as the system mode, an LTE-A UE can feed back the CSI through three kinds below.

1. LTE CSI Feedback

An LTE-A UE may be configured to feed back only the LTE CSI. The LTE-A UE may be requested to feed back the LTE CSI.

In this case, the performance of the LTE-A UE which receive data according to the LTE system mode can be optimized.

For the purpose of CSI feedback, the feedback mode of an LTE system may be set to remain intact. A CSI and a feedback channels on which the CSI is transmitted in the LTE system remain intact. Alternatively, the CSI is identical with that of the LTE system, but the feedback channel of the LTE-A system may be used as the feedback channel. Here, the LTE CSI may be configured so that it is piggybacked to the feedback channel of an LTE-A system.

2. LTE-A CSI Feedback

An LTE-A UE is operated in the LTE system mode, but the LTE-A CSI may be configured as fed back. The LTE-A UE may be requested to feed back the LTE-A CSI. For example, a CSI for the MIMO scheme of 8 transmit antennas may be fed back.

This is for the purpose of preparing for a case in which the system mode of the LTE-A UE is switched from the LTE system mode to the LTE-A system mode. If the system mode of the LTE-A UE is switched to the LTE-A system mode and the LTE-A UE receives data through the 8 transmit antennas, the performance of the system can be optimized. It is also useful when the LTE-A UE receives DL data through a transmission scheme determined according to a default mode.

As described above, the method of receiving DL data is identical with that of an LTE system, but CSI feedback may be for an LTE-A system.

3. LTE CSI and LTE-A CSI Feedback

An LTE-A UE is operated in the LTE system mode, but can be configured to feed back both the LTE CSI and the LTE-A CSI. In this case, even in the LTE system mode, an optimized performance can be provided within the capacity of an optimized LTE system. Further, in the case in which the system mode of an LTE-A UE is switched to the LTE-A system mode, an appropriate performance can be achieved.

4. The methods Nos. 1 to 3 described above can be used according to conditions. For example, the method No. 1, 2, or 2 may be used according to the time.

As described above, an LTE-A UE may be requested from LTE CSI feedback and LTE-A CSI feedback. In this case, the feedback cycle of each CSI may become problematic.

The LTE CSI and the LTE-A CSI may be transmitted at the same time or at different points of time. The feedback cycles of the LTE CSI and the LTE-A CSI may be set identically or differently. If the feedback cycle of the LTE-A CSI is set to be shorter than that of the LTE-A CSI, the LTE-A CSI can be more accurate than the LTE CSI. For example, the feedback cycle of the LTE-A CSI may be composed of 3 TTIs, and the feedback cycle of the LTE CSI may be independently composed, such as 10 TTIs.

Each of the LTE CSI and the LTE-A CSI may be fed back through a physical layer signaling or a higher layer signaling, such as an RRC signaling. The physical layer signaling may be transmitted through a PUCCH or a PUSCH.

The following table shows examples of channels allocated to the LTE CSI and the LTE-A CSI.

TABLE 1

|     | LTE CSI         | LTE-A CSI       |
| --- | --------------- | --------------- |
| (1) | PUCCH or PUSCH  | PUCCH or PUSCH  |
| (2) | PUCCH           | PUSCH           |
| (3) | PUSCH           | PUSCH           |
| (4) | PUSCH           | PUCCH           |
| (5) | PUCCH or PUSCH  | RRC             |
| (6) | RRC             | PUCCH or PUSCH  |

The LTE CSI and the LTE-A CSI can be fed back in such a way to feed back a difference. This method is called a delta feedback method. As an example of the delta feedback method, the LTE-A CSI may be fed back, and the LTE CSI may be fed back in terms of a difference with the LTE-A CSI. As another example, the LTE CSI may be fed back, and the LTE-A CSI may be fed back in terms of a difference with the LTE CSI.

In the case in which an LTE-A UE is configured as operated in the LTE system mode, the LTE-A UE can perform the entire DL transmission in the LTE system mode and perform the entire UL transmission in the LTE system mode.

In some embodiments, the system mode may be differently configured in the DL and the UL. Different system modes may be configured for DL transmission and UL transmission.

In some embodiments, DL transmission and UL transmission may be classified according to types, and the system mode may be independently configured for each type. Here, the type may be a transmit channel. For example, in the DL, a number of transmit channels, such as a PDSCH, a physical broadcast channel (PBCH), a physical multicast channel (PMCH), a PCFICH, a PDCCH, a PHICH, an RS, and a synchronization signal, may exist. In the UL, a number of transmit channel, such as a PUSCH, a PUCCH, a physical random access channel (PRACH), and an RS, may exist.

The system modes for PUCCH transmission, PUSCH transmission and/or SRS transmission of an LTE-A UE can be independently configured.

UL transmission of an LTE-A UE has the following characteristics.

(1) Transmission through a single antenna and transmission through multiple antennas are supported in UL transmission.

(2) Resource blocks allocated to one LTE-A UE for the purpose of PUSCH transmission may not be continuous in the frequency domain.

(3) One LTE-A UE may send a PUCCH and a PUSCH at the same time. Accordingly, the LTE-A UE may send UL control information on the PUCCH and, at the same time, send UL data on the PUSCH.

(4) A CSI may be cyclically transmitted on the PUSCH.

In UL transmission, the biggest difference between an LTE system and an LTE-A system is that the LTE system supports only transmission through a single antenna, whereas the LTE-A system supports transmission through multiple antennas. Accordingly, in UL transmission, the system mode may be either a single antenna mode or a multiple antenna mode. The single antenna mode may refer to the LTE system mode, and the multiple antenna mode may refer to the LTE-A system mode.

In the UL, the system mode may be independently configured according to the transmission format of a signal which is transmitted by an LTE-A UE. The transmission format may be any one of a PUSCH transmission format, a PUCCH transmission format, and an SRS transmission format.

1. PUSCH Transmission

If the system mode for PUSCH transmission of an LTE-A UE is configured as a single antenna mode, the LTE-A UE can send UL data on the PUSCH through a single antenna. Here, the LTE-A UE can send the UL data on the PUSCH using the same method as an LTE UE.

If the system mode for PUSCH transmission of an LTE-A UE is configured as a multiple antenna mode, the LTE-A UE can send UL data on the PUSCH through multiple antennas. In this case, a spatial multiplexing scheme, a transmit diversity scheme or the like can be used.

2. PUCCH Transmission

If the system mode of PUCCH transmission of an LTE-A UE is configured as a single antenna mode, the LTE-A UE can send UL control information on the PUCCH through a single antenna. In this case, the LTE-A UE can send the UL control information on the PUCCH using the same method as an LTE UE.

If the system mode of PUCCH transmission of an LTE-A UE is configured as a multiple antenna mode, the LTE-A UE can send UL control information on the PUCCH through multiple antennas.

3. the SRS Transmission

If the system mode of SRS transmission of an LTE-A UE is configured as a single antenna mode, the LTE-A UE can send an SRS through a single antenna. In this case, the LTE-A UE can send the SRS using the same method as an LTE UE.

If the system mode of SRS transmission of an LTE-A UE is configured as a multiple antenna mode, the LTE-A UE can send an SRS through multiple antennas. In this case, the SRS can be transmitted in a non-precoded and antenna-specific manner.

Figure 12:
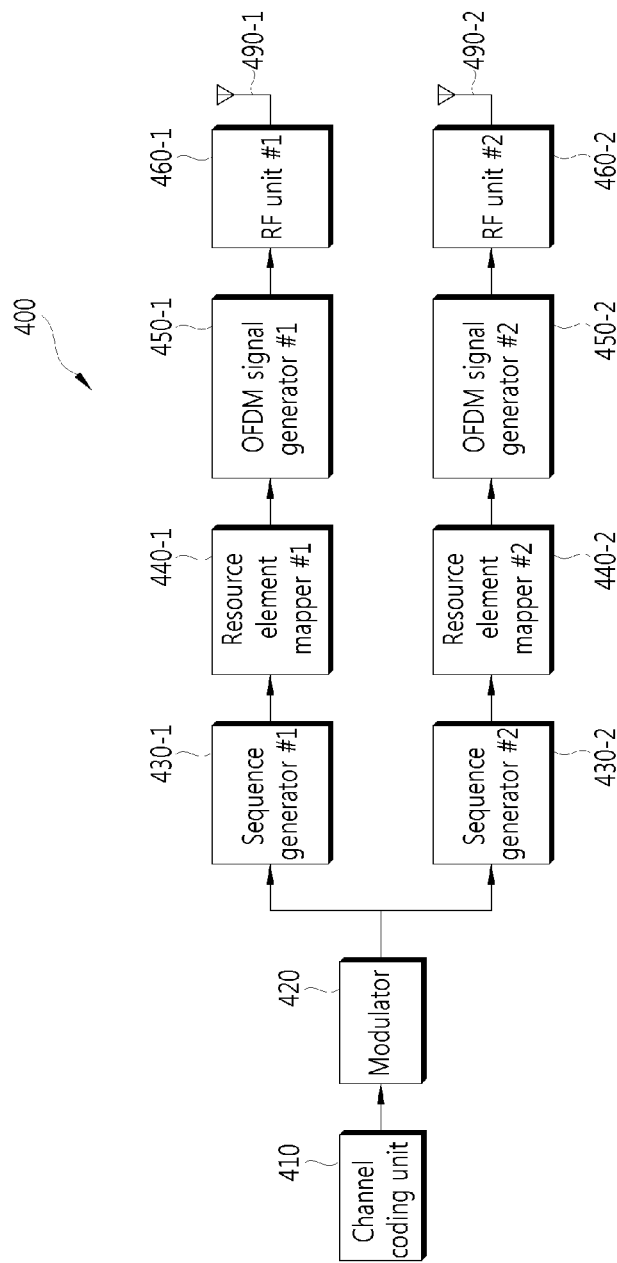
FIG. 12 is a block diagram showing an example of the structure of a transmitter for PUCCH transmission through two transmit antennas.

FIG. 12 is a block diagram showing an example of the structure of a transmitter for PUCCH transmission through two transmit antennas. Here, the transmitter may be part of an UE.

Referring to FIG. 12, the transmitter 400 includes a channel coding unit 410, a modulator 420, first and second sequence generators 430-1 and 430-2, first and second resource element mappers 440-1 and 440-2, first and second OFDM signal generators 450-1 and 450-2, first and second RF units 460-1 and 460-2, and first and second transmit antennas 490-1 and 490-2.

The channel coding unit 410 is coupled to the modulator 420, and the modulator 420 is coupled to the first and second sequence generators 430-1 and 430-2. The first and second sequence generators 430-1 and 430-2 are respectively coupled to the first and second resource element mappers 440-1 and 440-2. The first and second resource element mappers 440-1 and 440-2 are respectively coupled to the first and second OFDM signal generators 450-1 and 450-2. The first and second OFDM signal generators 450-1 and 450-2 are respectively coupled to the first and second RF units 460-1 and 460-2. The first and second RF units 460-1 and 460-2 are respectively coupled to the first and second transmit antennas 490-1 and 490-2. That is, an $n^{th}$ sequence generator 430-$n$ is coupled to an $n^{th}$ resource element mapper 440-$n$. The $n^{th}$ resource element mapper 440-$n$ is coupled to an $n^{th}$ OFDM signal generator 450-$n$. The $n^{th}$ OFDM signal generator 450-$n$ is coupled to an $n^{th}$ RF unit 460-$n$. The $n^{th}$ RF unit 460-$n$ is coupled to an $n^{th}$ antenna 490-$n$ (where n=1, 2). In the case of transmission through multiple antennas, one resource grid defined for every antenna may exist.

The modulator 420 may output one or more modulation symbols. The modulation symbols outputted from the modulator 420 are inputted to each of the first sequence generator 430-1 and the second sequence generator 430-2.

Two resource indices are allocated to the transmitter 400. The first and second sequence generators 430-1 and 430-2 are configured to generate spread sequences based on the two resource indices.

As described above, in PUCCH transmission for 2 transmit antennas, the same modulation symbols are transmitted on different resources through different antennas. This method is referred to as spatial orthogonal-resource transmit diversity (SORTD). For example, each of the PUCCH formats 1, 1a, and 1b may be transmitted using the SORTD method.

In some embodiments, different modulation symbols may be inputted to the first and second sequence generators 430-1 and 430-2. To this end, unlike FIG. 9, the transmitter may include a channel coding unit and a modulator respectively corresponding to the first and second sequence generators 430-1 and 430-2. In this case, in PUCCH transmission for 2 transmit antennas, different modulation symbols can be transmitted on different resources through respective different antennas. This method is referred to as spatial orthogonal-resource spatial multiplexing (SORSM).

The transmitter 400 can use multiple carriers because it sends PUCCHs in the LTE-A system mode. A description of a method and apparatus for transmitting PUCCHs, described above with reference to FIG. 9, can be applied to a method and apparatus for transmitting PUCCHs through 2 transmit antennas.

In the case in which an LTE-A UE is sought to send PUCCHs through 4 antennas, a 2 transmit antenna transmit diversity scheme can be used.

Figure 13:
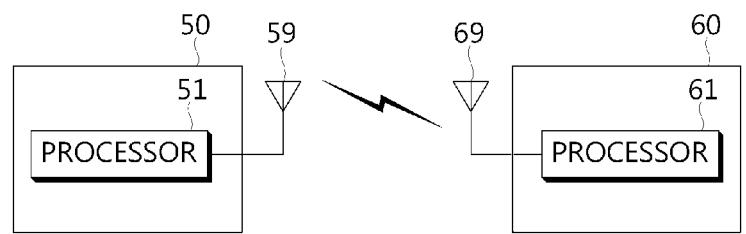
FIG. 13 is a block diagram of an apparatus for wireless communications in which the embodiments of the present invention are implemented.

FIG. 13 is a block diagram of an apparatus for wireless communications in which the embodiments of the present invention are implemented. A BS 50 includes a processor 51 and an antenna 59.

The processor 51 is coupled to the antenna 59 and configured to implement the proposed functions, processes, and/or methods. The layers of a protocol stack can be implemented by the processor 51. The antenna 59 is configured to receive and transmit signals. The number of antennas 59 may be 1 or more. The BS 50 may further include memory (not shown). The memory (not shown) is coupled to the processor 51 and configured to store various pieces of information for driving the processor 51.

A UE 60 includes a processor 61 and an antenna 69. The processor 61 is coupled to the antenna 69 and configured to implement the proposed functions, processes, and/or methods. The layers of a wireless interface protocol may be implemented by the processor 61. The antenna 69 is configured to receive and transmit signals. The number of antennas 69 may be 1 or more. The BS 60 may further include memory (not shown). The memory (not shown) is coupled to the processor 61 and configured to store various pieces of information for driving the processor 61.

Each of the processors 51 and 61 may include an application-specific integrated circuit (ASIC), other chipsets, a logic circuit, a data processor and/or an RF unit for converting a baseband signal into a radio signal or vice versa. The proposed transmitter may be implemented within each of the processors 51 and 61. The memory (not shown) may include read-only memory (ROM), random access memory (RAM), flash memory, a memory card, a storage media and/or other storage devices. In the case in which the embodiments are implemented in software, the above-described schemes or methods may be implemented using module processes, functions, etc. which are configured to perform the above functions. The modules may be stored in the memory (not shown) and executed by the processors 51 and 61. The memory (not shown) may be placed internally or externally to each of the processors 51 and 61 and coupled to each of the processors 51 and 61 through a variety of well-known means.

The method and apparatus for efficiently receiving and transmitting signals in a wireless communication system as described above can be provided. Different system modes may be configured in wireless communication systems, and an UE can be operated according to a configured system mode. The system mode may be adaptively configured according to conditions, and so an LTE-A UE can be operated like an LTE UE according to conditions. Accordingly, the throughput of the system can be optimized. Further, an LTE-A system is configured to maintain reverse compatibility with an LTE system. Accordingly, the LTE-A system can provide smooth communication services to not only a user who uses an LTE-A UE, but a user who uses an LTE UE. Moreover, since service providers can reuse the existing equipments, the overall performance of the system can be improved.

A person having ordinary skill in the art may easily understand additional advantages, objects, and characteristics of the present invention through the above description or the implementation of the present invention based on the above description. In the case in which those skilled in the art practices the present invention based on the above description, the present invention may further have unpredictable advantages.

Although, in the above illustrative system, the methods have been described on the basis of the flowcharts in the form of a series of the steps or blocks, the present invention is not limited to the sequence of the steps, and some of the steps may be performed at different sequences from the remaining steps or simultaneously with them. Further, those skilled in the art will understand that the steps shown in the flowcharts are not exclusive, the steps may include other steps, or one or more steps of the flowcharts may be deleted without affecting the scope of the present invention.

The above-described embodiments include various aspects of illustrations. Though all kinds of possible combinations for representing the various aspects may not be described, those skilled in the art will understand that other possible combinations are possible. For example, those skilled in the art may use each of the elements described in the embodiments in such a way as to combine the elements. Accordingly, the present invention is not to be limited to the embodiments, but is intended to cover the widest range which complies with the disclosed principles and new characteristics.

The invention claimed is:

1. A method of supporting multiple system modes in a wireless communication system, the method performed by a user equipment (UE) and comprising:
    receiving a radio resource control (RRC) signal from a base station, wherein the RRC signal indicates at least one first type subframe in which the UE operates in a long term evolution (LTE) mode and at least one second type subframe in which the UE operates in an LTE-Advanced (LTE-A) mode;
    receiving first type downlink data in the at least one first type subframe,
    wherein the first type downlink data is received through a maximum of four transmit antennas of the base station;
    receiving second type downlink data in the at least one second type subframe,
    wherein the second type downlink data is received through a maximum of eight transmit antennas of the base station;
    generating a first type feedback value indicating channel status associated with the first type downlink data,
    wherein the first type feedback value is delivered to the base station based on a first feedback cycle;
    generating a second type feedback value indicating channel status associated with the second type downlink data,
    wherein the second type feedback value is delivered to the base station based on a second feedback cycle set to be shorter than the first feedback cycle;
    transmitting first type uplink data in the at least first type subframe,
    wherein the first type uplink data is transmitted by a single antenna of a plurality of antennas of the UE; and
    transmitting second type uplink data in the at least one second type subframe,
    wherein the second type uplink data is transmitted by the plurality of antennas of the UE.

2. An apparatus for supporting multiple system modes in a wireless communication system, the apparatus comprising:
    a radio frequency unit configured to transmit and receive signals; and
    a processor coupled to the radio frequency unit and configured to:
    receive a radio resource control (RRC) signal from a base station, wherein the RRC signal indicates at least one first type subframe in which the apparatus operates in a long term evolution (LTE) mode and at least one second type subframe in which the apparatus operates in an LTE-Advanced (LTE-A) mode;
    receive first type downlink data in the at least one first type subframe,
    wherein the first type downlink data is received through a maximum of four transmit antennas of the base station;
    receive second type downlink data in the at least one second type subframe,
    wherein the second type downlink data is received through a maximum of eight transmit antennas of the base station;
    generate a first type feedback value indicating channel status associated with the first type downlink data,
    wherein the first type feedback value is delivered to the base station based on a first feedback cycle;
    generate a second type feedback value indicating channel status associated with the second type downlink data,
    wherein the second type feedback value is delivered to the base station based on a second feedback cycle set to be shorter than the first feedback cycle;
    transmit first type uplink data in the at least one first type subframe,
    wherein the first type uplink data is transmitted by a single antenna of a plurality of antennas of the apparatus; and
    transmit second type uplink data in the at least one second type subframe,
    wherein the second type uplink data is transmitted by the plurality of antennas of the apparatus.

3. The method of claim 1, further comprising:
    obtaining first type reference signals used for the four transmit antennas of the base station in the at least one first type subframe; and
    obtaining second type reference signals used for the eight transmit antennas of the base station in the at least one second type subframe.

4. The method of claim 3,
    wherein the first type reference signals are common in a cell, and
    wherein the second type reference signals are specific to each UE.

5. The method of claim 3,
    wherein the first type downlink data is received via a single downlink component carrier of multiple downlink component carriers in the at least one first type subframe, and
    wherein the second type downlink data is received via the multiple downlink component carriers in the at least one second type subframe.

6. The method of claim 1,
    wherein the second type feedback value is set to indicate an increment to the first type feedback value.

7. The apparatus of claim 2, wherein the processor is further configured to:
    obtain first type reference signals used for the four transmit antennas of the base station in the at least one first type subframe; and
    obtain second type reference signals used for the eight transmit antennas of the base station in the at least one second type subframe.

8. The apparatus of claim 7,
    wherein the first type reference signals are common in a cell, and
    wherein the second type reference signals are specific to each apparatus.

9. The apparatus of claim 7,
    wherein the first type downlink data is received via a single downlink component carrier of multiple downlink component carriers in the at least one first type subframe, and
    wherein the second type downlink data is received via the multiple downlink component carriers in the at least one second type subframe.

10. The apparatus of claim 2,
wherein the second type feedback value is set to indicate an increment to the first type feedback value.

\* \* \* \* \*